Dec. 16, 1958

H. L. PERNICK 2,864,950

MEANS FOR PHASE DISCRIMINATION OF
AN ALTERNATING CURRENT SIGNAL

Filed Nov. 30, 1954

INVENTOR
Henry L. Pernick
BY Paul Kolisch
ATTORNEY

Dec. 16, 1958 H. L. PERNICK 2,864,950
MEANS FOR PHASE DISCRIMINATION OF
AN ALTERNATING CURRENT SIGNAL
Filed Nov. 30, 1954 2 Sheets-Sheet 2
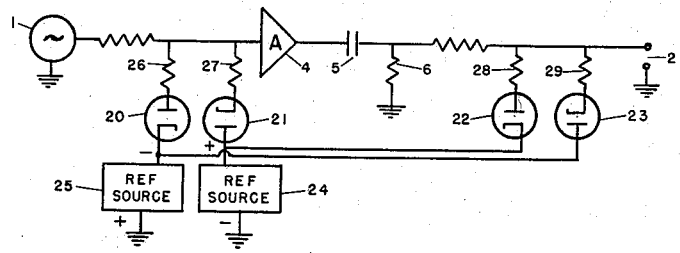
FIG. 4
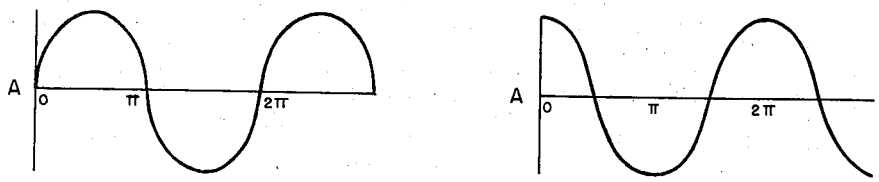
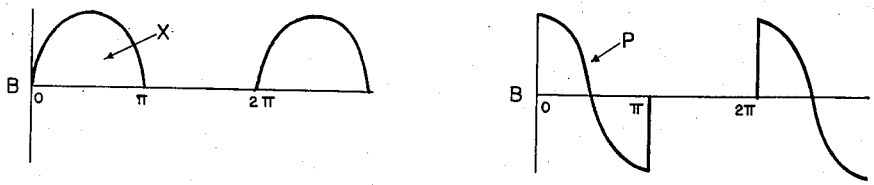
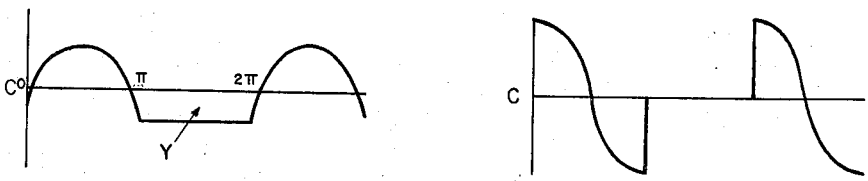
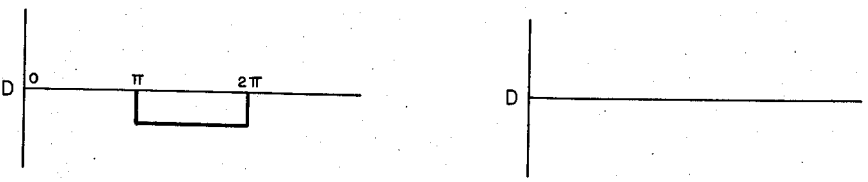
FIG. 6 FIG. 7
INVENTOR
Henry L. Pernick
BY Paul Kolisch
ATTORNEY

' # 2,864,950

MEANS FOR PHASE DISCRIMINATION OF AN ALTERNATING CURRENT SIGNAL

Henry L. Pernick, New York, N. Y., assignor, by mesne assignments, to United Aircraft Corporation, East Hartford, Conn., a corporation of Delaware Application November 30, 1954, Serial No. 472,121

7 Claims. (Cl. 250—27)

This invention relates to a phase discriminator circuit and particularly to a circuit capable of selecting a desired phase component from an applied wave.

More particularly, the invention relates to a circuit which utilizes a reference source to select the desired phase component from the applied wave.

Phase discriminator circuits which are capable of selecting the in-phase component or phase quadrature component from an applied wave, have found use in many systems. One example, is the alternating-current servo mechanism system which employs servo amplifiers. The two phase servo motor which the amplifier ordinarily feeds in such a system will develop torque only if the amplifier output is in quadrature with the motor fixed field excitation. Amplifier output signals not possessing the above phase relationship consequently produce no useful effect and in fact increase heat dissipation in the motor. Furthermore, allowing such signals to pass through the amplifier, may cause saturation of the amplifier stages and impair the ability of the amplifier to transmit the desired signals.

Phase discriminator circuits are often required in resolver test work where it is necessary to measure the in-phase and/or quadrature components. Also, in the multiplex transmission of a plurality of signals over a pair of lines, information may be carried by in-phase and phase quadrature signals, and detected by in-phase and phase quadrature discriminators.

Accordingly, it is an object of this invention to provide a phase discriminator circuit which is extremely simple and capable of performing each of the above-mentioned functions.

In accordance with an aspect of my invention, there is provided a phase discriminator circuit for selecting a desired phase component from an input wave having a given frequency. A discrete part of each cycle, containing the desired phase component, is applied to a storage device, e. g. a capacitor, which effectively shifts part of the stored energy to the remaining part of each cycle. The energy in the remaining part of the cycle which may be of a finite or zero value, is representative of the desired phase component and is selected at the output of the discriminator circuit.

The above-mentioned and other features and objects of this invention and the manner of attaining them will become more apparent, and the invention itself will be best understood by reference to the following description of an embodiment of the invention taken in connection with the accompanying drawings, wherein:

Figs. 2, 3 and 4 are schematic diagrams of specific embodiments of the invention;

Fig. 6 shows the progress of the applied wave in the circuit as the in-phase component is selected therefrom; and Fig. 7 shows the progress of the applied wave in the circuit as the phase quadrature component is selected therefrom.

Fig. 1 illustrates the general embodiment of the phase discriminator circuit capable of selecting the in-phase or phase quadrature component from an applied wave supplied by an alternating-current source 1, and passing an energy-component representative of the selected phase component to the output terminals 2.

Figure 1:
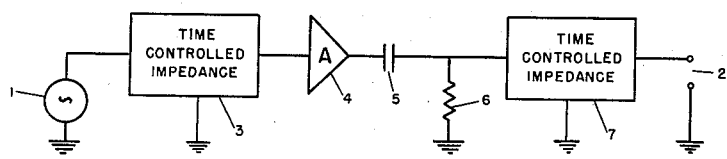
Fig. 1 is a schematic diagram of a generic embodiment of the invention.

The alternating current wave is applied to a first time controlled impedance 3 which blocks or attenuates a predetermined portion of each cycle. The portion blocked depends on the component to be selected. For example, if it is desired to select the in-phase component of the alternating wave, then the time controlled impedance 3 is operated to block or attenuate half the alternating current cycle, leaving a pulsating direct current wave form, as shown in Fig. 6.

In Fig. 6, A is the wave form of the applied wave and B is the wave form at the output of the blocking impedance 3.

The pulsating direct current wave form is amplified in amplifier 4 and applied to a storage device such as a capacitor 5. Since a capacitor cannot pass direct current energy, the output from capacitor 5 is substantially the wave form shown in Fig. 6C, assuming that the resistor 6 together with capacitor 5 produce a negligible phase shift. Thus, the average energy stored in capacitor 5 during the application of the unblocked portion of the cycle, indicated at X, is derived from the capacitor 5 during that part of the cycle initially blocked and indicated at Y. In other words, the average energy stored in capacitor 5 is shifted from the unblocked portion of the cycle to the initially blocked portion of the cycle.

The wave form as derived from the capacitor 5 is applied to a second time-controlled impedance 7 which is timed to block or attenuate the other half of the cycle and thereby pass to the output 2 the wave form shown at Fig. 6D. The energy component appearing at the output of the circuit is representative of the in-phase component and is a function of the amplifier gain. Thus, the component selected is controlled by the periodically and sequentially operated impedances 3 and 7.

The average or D. C. level present in the wave form of Fig. 6D may be removed, if necessary, by the use of an R. C. coupling circuit, such means being well known in the art.

Figure 7 illustrates the action of the circuit in suppressing the undesired phase component of the signal. The undesired signal in this case is the quadrature phase component of the input signal 1.

The quadrature-phase wave is shown at Fig. 7A and the blocked wave form is shown at Fig. 7B, the unblocked portion being shown at P. Since the wave form P is symmetrical and has no direct current component it is unaffected by the capacitor 5 and the wave form at the output thereof is indicated by Fig. 7C. Timely operation of impedance 7 blocks the first part of the cycle thereby passing zero energy to the output 2 as indicated by Fig. 7D. Thus, the energy component representative of the phase-quadrature component is zero.

If it is desired to select the in-phase component, the impedances are operated as described above; however, if it is desired to select the phase quadrature component, the impedances are operated 90° out of phase with respect to the phase of the applied wave. For example, for phase quadrature selection, impedance 3 is operated to block one half cycle of the wave when it is 90° out of phase with the applied wave.

The desired phase component is selected by the timely operation of the impedances 3 and 7, and by utilizing the energy displacing characteristic of a storage device, such as a capacitor. Thus, by operating one impedance during one half cycle and the other impedance during the other half cycle, the complete cycle is sequentially blocked. However, the discrete energy value derived at the output of the circuit is produced only for input signal components that are in-phase with the time controlled impedance switching.

As has been explained hereinabove, the impedance 3 provides a means for applying a predetermined portion of the input signal to amplifier 4. It will be understood that capacitor 5 provides a high pass filtering action for the amplified predetermined portion of the input signal with the result that a periodic wave form including no direct current component is fed to the impedance 7. The impedance 7 eliminates from this periodic wave form a portion corresponding to the predetermined signal portion to produce an output representative of the desired phase component of the input signal.

Figure 2:
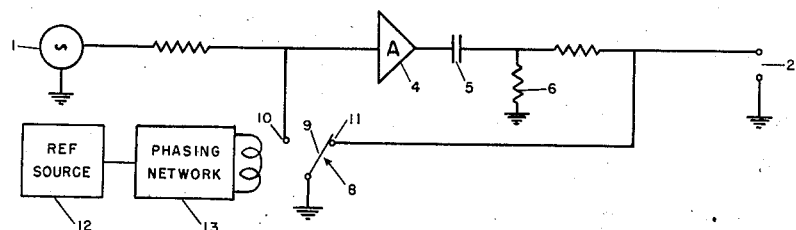
Figure 3:
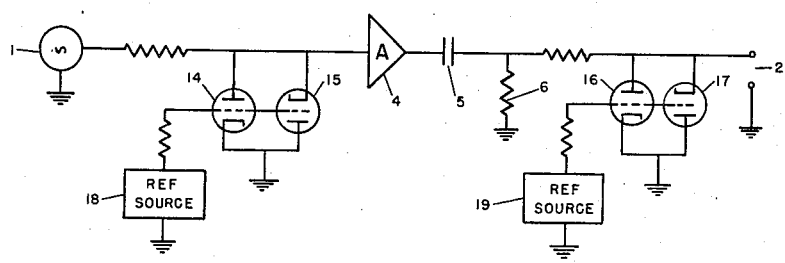

Of the many suitable forms of time controlled impedances which should be apparent to one skilled in the art, three satisfactory circuits are shown by Figs. 2, 3 and 4.

Referring to Fig. 2, a mechanical switch indicated at 8 is used as the time-controlled impedance. The switch 8 comprises an armature 9 movable between two terminals 10 and 11. Terminal 10 is coupled to the input, and terminal 11 to the output, of capacitor 5. A reference source 12 is provided which generates a wave having the same frequency as the applied wave. Coupled to the reference source 12 is a phasing network 13 which controls the time of operation of armature 9. For example, if the in-phase components are to be selected, the armature 9 will be in the position shown during the first half of the cycle from 0 to $\pi$, thereby permitting the wave to be applied unattenuated to the capacitor 5. During the period from $\pi$ to $2\pi$, the phasing network actuates the armature 9 to make contact with terminal 10 thereby passing that portion of the cycle to ground. The sequence of operation is repeated with each cycle. If it is desired to select the phase-quadrature component, the phasing network simply delays the time of operating the armature 9 by the period $\pi/2$.

In Fig. 3, the time-controlled impedance devices comprise triodes 14, 15 and 16, 17 respectively. A pair of triodes is necessary for each impedance switch. In each impedance switch the cathode and anode of one triode are coupled respectively to the anode and cathode of the other, and the junctions thereof are coupled respectively to ground and either to the amplifier input or output of capacitor 5, depending on the location of the switch. A reference source 18 of biasing voltage is coupled to the grids of the tubes 14, 15 and a similar reference source 19 is coupled to the grids of tubes 16 and 17. The sources 18 and 19 drive the grids to effect the switching action required to produce the wave forms shown by Figs. 6 and 7. For example, Figures 5A and 5B are the waveforms of reference sources 19 and 18 respectively that would be required to select an in-phase signal component.

Figure 5:
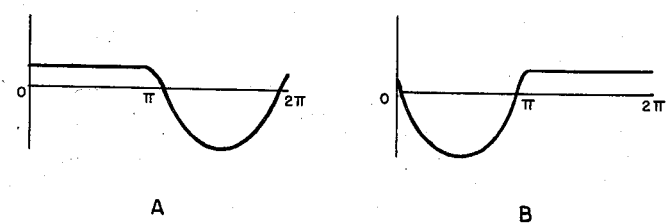
Fig. 5 shows biasing voltage wave forms used to operate the circuit of Fig. 3.

Fig. 5A is the wave form of the biasing potential applied by source 18 to tubes 14 and 15, and Fig. 5B is the wave form of biasing potential applied by source 19 to the tubes 16 and 17. The negative portion of the biasing potential applied by the sources is sufficient to cut off the tubes to which it is applied. For example, if it is desired to select the in-phase component (Fig. 6) during the period from 0 to $\pi$ the output energy from the capacitor 5 is positive, therefore tube 16 conducts and passes that portion of the cycle to ground. During the period from $\pi$ to $2\pi$, the applied wave is negative and tube 15 conducts shunting that portion of the cycle to ground. If it is desired to select the phase quadrature components, the reference signals must be shifted in phase by 90° from those shown on Figures 5A and 5B.

In Fig. 4, the time-controlled impedances comprise diodes 20, 21, and 22, 23 respectively. The anode of diode 20, and the cathode of diode 21 are coupled to the input of amplifier 4, and the anode of diode 22 and the cathode of diode 23 are coupled to the output of capacitor 5. The cathode of diode 22 is coupled to the anode of diode 21 and the junction thereof is coupled to one terminal of given polarity, of a reference source 24; and, the anode of diode 23 is coupled to the cathode of diode 20, and the junction thereof is coupled to a terminal of opposite polarity of a reference source 25. The polarities of the reference sources 24 and 25 are changed during each half cycle so that from 0 to $\pi$ the polarities of the sources are as indicated, and from $\pi$ to $2\pi$ they are of reverse polarity. Reference sources 24 and 25 deliver equal but phase opposite signals to each diode pair. Resistors 28 and 29 are of equal ohmic value. Thus, for selection of in-phase components, diodes 20 and 21 conduct through resistors 26 and 27, during the first half cycle from 0 to $\pi$. Because of this conduction, the junction of resistors 26 and 27 experiences no voltage component due to the reference sources. However, due to the signal coming from input 1, the junction resistors 26 and 27 appear as a resistance equal to one half of resistor 26 or 27 and consequently the signal delivered to the amplifier 4 is attenuated. During the next half cycle, diodes 20 and 21 are non-conducting and no attenuation of the signal from input 1 occurs.

A similar action takes place on diodes 22 and 23 and resistors 28 and 29 as discussed above, except that this action occurs on the opposite half cycle to those above.

While the invention has been disclosed in connection with specific embodiments, it is to be understood that variations and changes in the details may be made without departing from the spirit of the invention. It is desired, therefore, to be limited only as indicated by the scope of the appended claims.

I claim:

1. A phase discriminating circuit for selecting a desired phase component of an input signal including in combination first means for eliminating a predetermined portion of said input signal to produce a first output signal, means for applying said input signal to said first eliminating means, means comprising a series capacitor for removing the direct current component from said output signal to produce a periodic signal, means for applying the output signal to the removing means, second means for eliminating from the periodic signal the portion of said periodic signal corresponding to the portion of the input signal other than said predetermined portion and means for applying said periodic signal to the second eliminating means to produce an output wave form representative of the desired phase component.

2. A phase discriminating circuit as in claim 1 in which said first eliminating means eliminates a portion of said input signal corresponding to a half cycle of the input signal.

3. A phase discriminating circuit as in claim 1 in which said first and second eliminating means are respective alternately operated time-controlled impedances.

4. A phase discriminating circuit for selecting a desired phase component of an input signal including in combination first means for eliminating a predetermined portion of said input signal to produce a first output signal, means for applying said input signal to said first eliminating means, means comprising a series capacitor for removing the direct current component from said output signal to produce a periodic signal, second means for eliminating the portion of said periodic signal corresponding to the portion of the input signal other than said predetermined portion, means for applying said periodic signal to the second eliminating means to produce an output wave form representative of the desired phase component and means for alternately operating said eliminating means.

5. A phase discriminating circuit as in claim 4 in which said direct current removing means includes an input terminal and an output terminal, each of said eliminating means including an electron tube having a pair of electrodes, means connecting one of said electrodes to ground, means connecting the other of said electrodes to one of said terminals, said operating means including means for periodically rendering said electron tube conductive.

6. A phase discriminating circuit as in claim 4 in which said direct current component removing means includes an input terminal and an output terminal, each of said eliminating means including a pair of triodes having anodes and cathodes and grids, means connecting one of said anodes and one of said cathodes to one of said terminals, means connecting the other of said anodes and the other of said cathodes to ground, said operating means comprising means for applying a grid potential to said grids periodically to connect the associated terminal to ground.

7. A phase discriminating circuit as in claim 4 in which said direct current component removing means includes an input terminal and an output terminal, each of said eliminating means comprising a pair of diodes each having an anode and a cathode, said operating means including a source of electrical energy having a pair of terminals of opposite polarity and means for periodically reversing the terminal polarity, means connecting an anode and a cathode of the respective diodes of a pair to one of said terminals, means connecting the other anode and the other cathode of said pair to the respective source terminals, means connecting an anode and a cathode of the respective diodes of the other pair to the other terminal, and means connecting the other anode and cathode of said other pair to the respective source terminals.

References Cited in the file of this patent

UNITED STATES PATENTS

| | | |
|---|---|---|
| 2,511,671 | Jacob | June 13, 1950 |
| 2,625,662 | Gaynor et al. | Jan. 13, 1953 |
| 2,666,136 | Carpenter | Jan. 12, 1954 |
| 2,692,343 | Spiro | Oct. 19, 1954 |
| 2,762,978 | Norton | Sept. 11, 1956 |